US012715706B2

(12) United States Patent
Ueno

(10) Patent No.: US 12,715,706 B2
(45) Date of Patent: Aug. 25, 2026

(54) INFORMATION PROCESSING APPARATUS, INFORMATION PROCESSING METHOD, AND COMPUTER PROGRAM PRODUCT

(71) Applicant: KABUSHIKI KAISHA TOSHIBA, Tokyo (JP)

(72) Inventor: Ken Ueno, Tokyo (JP)

(73) Assignee: KABUSHIKI KAISHA TOSHIBA, Kawasaki Kanagawa (JP)

( * ) Notice: Subject to any disclaimer, the term of this patent is extended or adjusted under 35 U.S.C. 154(b) by 750 days.

(21) Appl. No.: 18/173,973

(22) Filed: Feb. 24, 2023

(65) Prior Publication Data

US 2023/0399179 A1 Dec. 14, 2023

(30) Foreign Application Priority Data

Jun. 14, 2022 (JP) ................................ 2022-095404

(51) Int. Cl.
*B65G 43/00* (2006.01)

(52) U.S. Cl.
CPC ...... *B65G 43/00* (2013.01); *B65G 2203/0283* (2013.01); *B65G 2203/04* (2013.01)

(58) Field of Classification Search
CPC ............ B65G 43/00; B65G 2203/0283; B65G 2203/04; G07D 11/16
See application file for complete search history.

(56) References Cited

U.S. PATENT DOCUMENTS

| | | | | |
|---|---|---|---|---|
| 2018/0075235 | A1* | 3/2018 | Tajima | G06F 21/554 |
| 2021/0183528 | A1* | 6/2021 | Maya | G16Y 40/10 |
| 2021/0397938 | A1 | 12/2021 | Tora et al. | |
| 2022/0163947 | A1* | 5/2022 | Michan | G05B 23/0281 |

FOREIGN PATENT DOCUMENTS

| | | | | | |
|---|---|---|---|---|---|
| JP | 2703414 | B2 | | 1/1998 | |
| JP | 2007-217103 | A | | 8/2007 | |
| JP | 2012094046 | A | * | 5/2012 | |
| JP | 2018-45403 | | | 3/2018 | |
| JP | 2018045403 | A | * | 3/2018 | G06F 21/554 |
| JP | 2021-96660 | A | | 6/2021 | |
| TW | 1844868 | B | * | 6/2024 | G06T 7/0002 |
| WO | WO-2009110329 | A1 | * | 9/2009 | G06F 11/0748 |

(Continued)

OTHER PUBLICATIONS

JP2012094046_EN_description_with_paragraph_numbers_espacenet (Year: 2012).*

(Continued)

*Primary Examiner* — Jacob S. Scott
*Assistant Examiner* — Erin Morris
(74) *Attorney, Agent, or Firm* — Finnegan, Henderson, Farabow, Garrett & Dunner, LLP

(57) ABSTRACT

An information processing apparatus includes a candidate generating unit and a correcting unit. The candidate generating unit generates, using first log information indicating states of a monitoring target and acquired in a certain time period, a frequently appearing transition path of states of the monitoring target, as a candidate of a first path that is a transition path presumed to represent a first specific condition. The correcting unit obtains the first path by correcting the candidate using a predetermined reference path.

14 Claims, 9 Drawing Sheets

(56) References Cited

FOREIGN PATENT DOCUMENTS

| | | | | |
|---|---|---|---|---|
| WO | WO-2020175147 A1 * | 9/2020 | ............. | G06N 3/045 |
| WO | WO-2023276595 A1 * | 1/2023 | ........... | G06T 7/0002 |

OTHER PUBLICATIONS

JP2018045403_EN_description_with_paragraph_numbers_espacenet (Year: 2018).*
WO2020175147_EN_description_with_paragraph_numbers_espacenet (Year: 2020).*
Jian Pei et al., "PrefixSpan: Mining Sequential Patterns Efficiently by Prefix-Projected Pattern Growth," Int'l Conf. on Data Eng., 10 pages (2001).
Japan Patent Office, Office Action in JP App. No. 2022-095404 (Jun. 3, 2025) 6 pages.

* cited by examiner

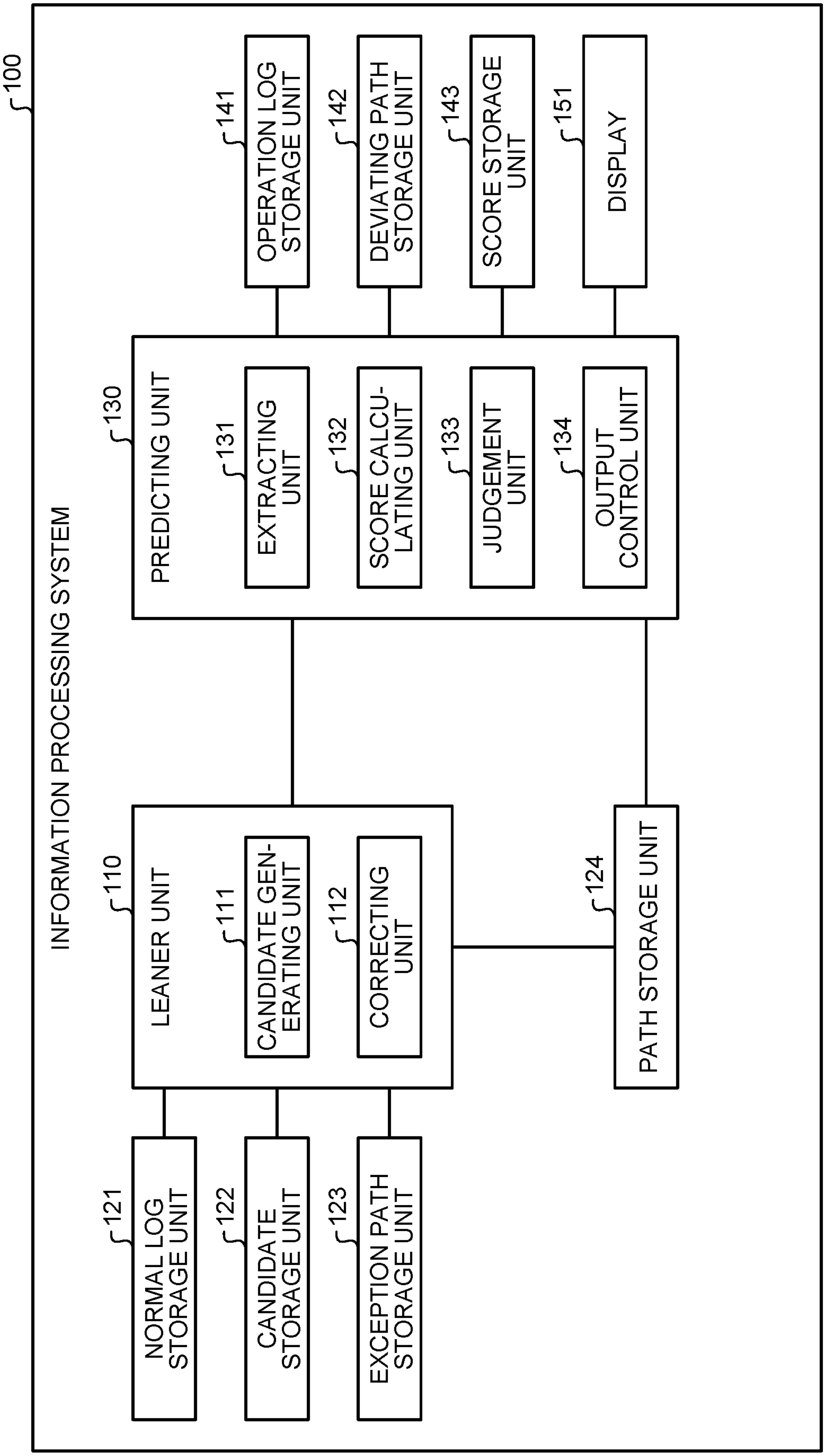

FIG.2
100
INFORMATION PROCESSING SYSTEM
121
NORMAL LOG STORAGE UNIT
122
CANDIDATE STORAGE UNIT
123
EXCEPTION PATH STORAGE UNIT
110
LEANER UNIT
111
CANDIDATE GEN-ERATING UNIT
112
CORRECTING UNIT
124
PATH STORAGE UNIT
130
PREDICTING UNIT
131
EXTRACTING UNIT
132
SCORE CALCU-LATING UNIT
133
JUDGEMENT UNIT
134
OUTPUT CONTROL UNIT
141
OPERATION LOG STORAGE UNIT
142
DEVIATING PATH STORAGE UNIT
143
SCORE STORAGE UNIT
151
DISPLAY

FIG.3

| TIME (msec) | EVENT | MEDIA COUNT |
|---|---|---|
| 0 | P1 | 2 |
| 20 | P2 | 2 |
| 40 | P3 | 1 |
| 60 | P3 | 1 |
| 65 | P2 | 1 |
| 70 | P3 | 1 |
| 75 | P4 | 1 |
| 80 | P4 | 1 |
| ... | ... | ... |

600
601
602

SIGN SCORE RESULTANT OF STATE PATH ANALYSIS

SIGN SCORE

WARNING 1.0
0.8
0.6
0.4
0.2
0.0

2020-01
2020-04
2020-07
2020-10
2021-01
2021-04
2021-07

GROUND ON WHICH SIGN IS DETECTED IN STATE PATH ANALYSIS

2021/07/02 HUMIDITY: 70%

DEVIATING PATH P1→P2→P2→P2→P3→P4

FREQUENCY OF OCCURRENCE: 12 TIMES/5314 TIMES

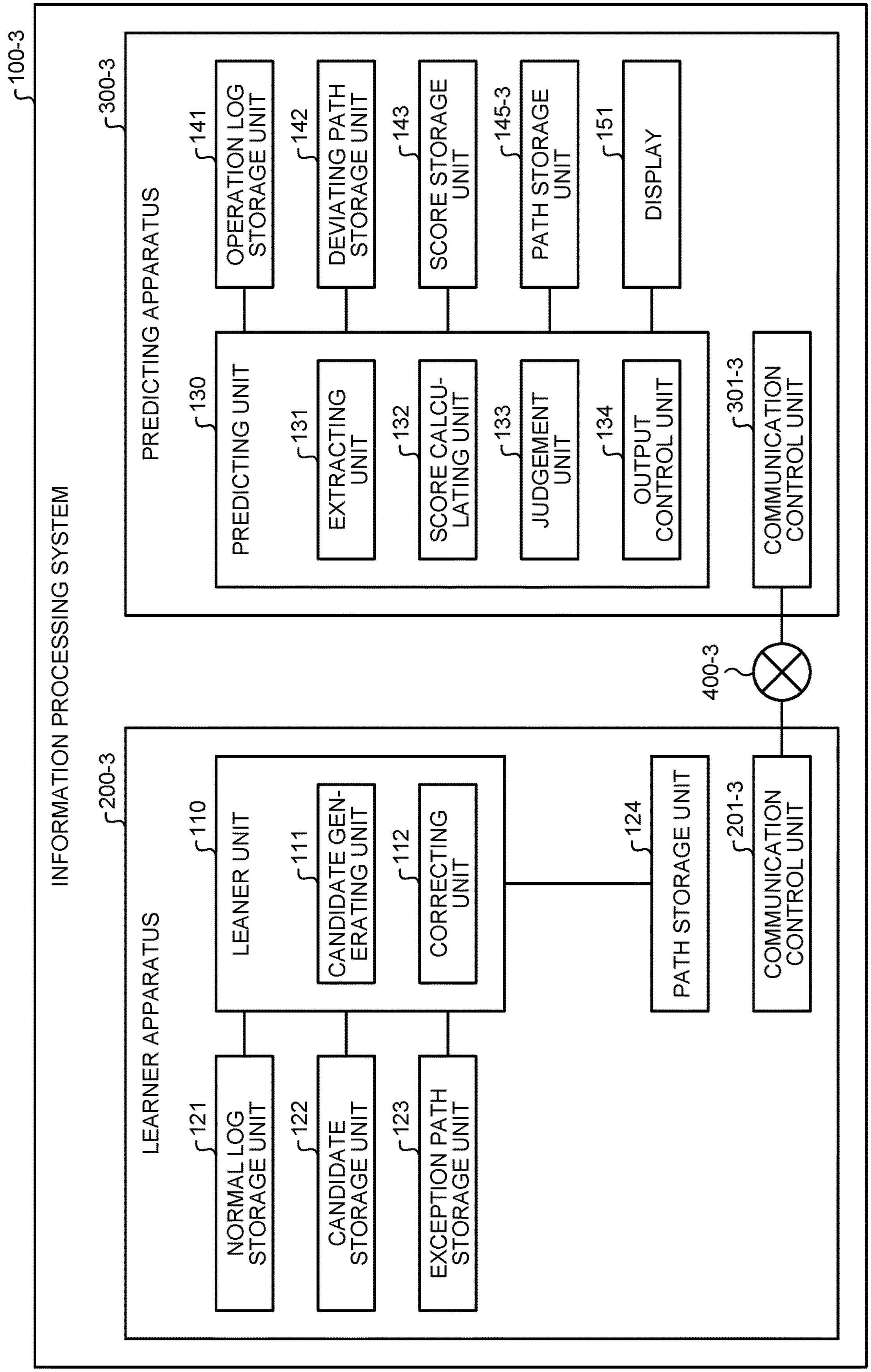

FIG.8
100-3
INFORMATION PROCESSING SYSTEM
200-3
LEARNER APPARATUS
121
NORMAL LOG STORAGE UNIT
122
CANDIDATE STORAGE UNIT
123
EXCEPTION PATH STORAGE UNIT
110
LEANER UNIT
111
CANDIDATE GEN-ERATING UNIT
112
CORRECTING UNIT
124
PATH STORAGE UNIT
201-3
COMMUNICATION CONTROL UNIT
400-3
300-3
PREDICTING APPARATUS
130
PREDICTING UNIT
131
EXTRACTING UNIT
132
SCORE CALCU-LATING UNIT
133
JUDGEMENT UNIT
134
OUTPUT CONTROL UNIT
141
OPERATION LOG STORAGE UNIT
142
DEVIATING PATH STORAGE UNIT
143
SCORE STORAGE UNIT
145-3
PATH STORAGE UNIT
151
DISPLAY
301-3
COMMUNICATION CONTROL UNIT

INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2022-095404, filed on Jun. 14, 2022; the entire contents of which are incorporated herein by reference.

FIELD

Embodiments described herein relate generally to an information processing apparatus, an information processing method, and a computer program product.

BACKGROUND

Conveyor apparatuses for conveying media, such as an automated railway ticket gate, a mail sorting machine, a bill sorting machine, a multifunction peripheral (MFP), and a scanner have been known. Tickets, mails, banknotes, and printouts are some examples of the media. In such a conveyor apparatus, rollers for conveying a medium are incorporated as key parts.

When rollers degrade, the rollers may not only become incapable of conveying a medium, but also damage the medium. Therefore, abnormal sign detection that is detection of an abnormal sign of each part of a conveyor apparatus, including a roller, is performed so as to enable maintenance of the apparatus.

BRIEF DESCRIPTION OF THE DRAWINGS

FIG. 2 is a block diagram of an information processing system according to a first embodiment;

FIG. 3 is a schematic illustrating one example of a data structure of an operation log;

FIG. 8 is a block diagram of an information processing system according to a third embodiment.

DETAILED DESCRIPTION

Figure 1:
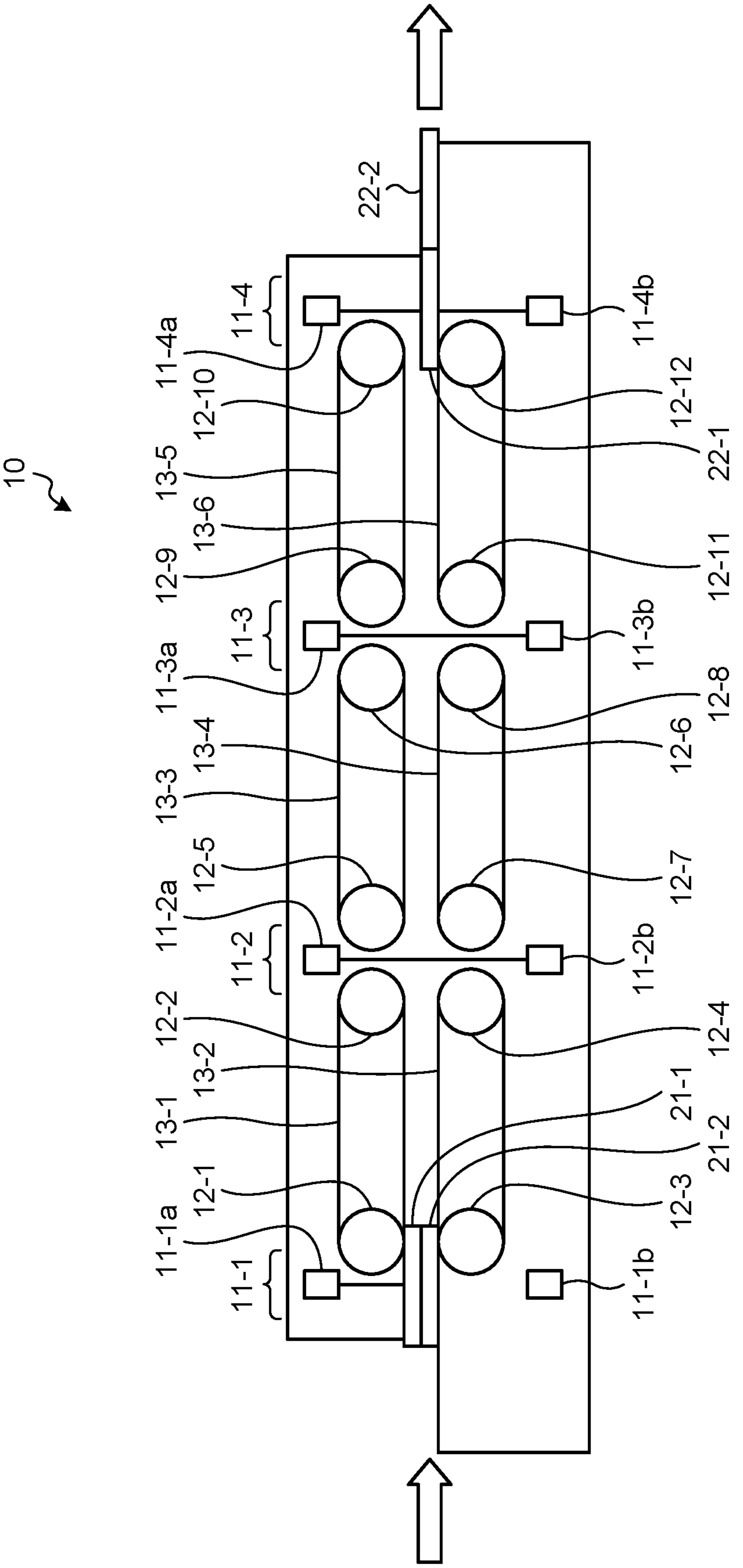
FIG. 1 is a schematic illustrating a configuration of a conveyor apparatus that is a target of abnormal sign detection.

An information processing apparatus according to an embodiment includes one or more hardware processors configured to function as a candidate generating unit and a correcting unit. The candidate generating unit generates, using first log information indicating states of a monitoring target and acquired in a certain time period, a frequently appearing transition path of states of the monitoring target, as a candidate of a first path that is a transition path presumed to represent a first specific condition. The correcting unit obtains the first path by correcting the candidate using a predetermined reference path.

Some preferred embodiments of an information processing system (one example of an information processing apparatus) according to the present invention will now be explained in detail with reference to the appended drawings. Explained below is an example in which the present invention is applied to a system that detects a specific condition of a monitoring target that is a conveyor apparatus that conveys a medium. However, the system to which the present invention is applicable is not limited thereto. The monitoring target may be any apparatus other than a conveyor apparatus. Furthermore, the specific condition (second specific condition) of the monitoring target is, for example, an abnormality, but is not limited thereto.

As mentioned earlier, as the use becomes extended, parts of the conveyor apparatus such as rollers degrade. Therefore, appropriate maintenance, such as replacement and cleaning of the rollers, is required for the extended use. In addition, processing of conveyance control sometimes becomes complex. For example, when an abnormal conveyance could occur, control is performed so as to keep the conveyance of a medium without an abnormality as far as possible. For example, the medium is moved a little backward, and then starts being conveyed again. In detecting abnormal signs, it is necessary to distinguish such complex processing from abnormalities.

Examples of the method for detecting abnormal signs include a method for detecting an abnormality based on a state transition diagram as specified in a design document, and a method that uses a machine learning model. The method that is based on the state transition diagram is capable of calculating an abnormal score indicating the severity of an abnormality having occurred, or detecting an abnormality by focusing only on limited causes of abnormalities, for example. With the method that uses an advanced machine learning model, such as deep learning, by contrast, internal processing is a black box to users, and there are cases that the ground of a detection result is not determinable. In other words, with either one of these methods, it has been sometimes difficult to present a ground of a detection result, while detecting abnormal behaviors in the entire system.

The information processing system according to the embodiment described below detects an abnormality early in the stage of a sign, and quantifies the sign as a sign score. The information processing system according to the embodiment also builds an abnormal sign detection model for detecting a sequential pattern of control events and abnormal events with the sequential pattern serving as a ground of sign, and implements abnormal sign detection using the abnormal sign detection model based on a deviation from the sequential pattern during a normal condition.

FIG. 1 is a schematic illustrating a configuration of a conveyor apparatus 10 (monitoring target) that is a target of abnormal sign detection. As illustrated in FIG. 1, the conveyor apparatus 10 includes medium passage sensors 11-1 to 11-4, conveyance rollers 12-1 to 12-12, and conveyance belts 13-1 to 13-6.

The arrows indicate a direction in which a medium is conveyed. In FIG. 1, an example in which a medium is conveyed from left to right is illustrated. The conveyance belts 13-1 to 13-6 convey the medium. FIG. 1 illustrates, as examples of a medium, media 21-1 and 21-2 having been just fed into a feeding nip, and media 22-1 and 22-2 having been discharged from the conveyance belts 13-5 and 13-6 that are disposed on a discharging side of the media (on the right side in FIG. 1).

The conveyance rollers 12-1 to 12-12 are rollers for causing corresponding ones of the conveyance belts 13-1 to 13-6 to rotate, as listed below:

The conveyance rollers 12-1 and 12-2: the conveyance belt 13-1

The conveyance rollers 12-3 and 12-4: the conveyance belt 13-2

The conveyance rollers 12-5 and 12-6: the conveyance belt 13-3

The conveyance rollers 12-7 and 12-8: the conveyance belt 13-4 the conveyance rollers 12-9 and 12-10: the conveyance belt 13-5

The conveyance rollers 12-11 and 12-12: the conveyance belt 13-6

The medium passage sensors 11-1 to 11-4 detect a passage of a medium at positions different from one another along a path in which the medium is conveyed. For example, the medium passage sensor 11-1 detects a passage of a medium having been fed into the feeding nip. The medium passage sensor 11-2 detects a passage of a medium being conveyed from the conveyance belts 13-1 and 13-2 to the conveyance belts 13-3 and 13-4. The medium passage sensor 11-3 detects a passage of a medium being conveyed from the conveyance belts 13-3 and 13-4 to the conveyance belts 13-5 and 13-6. The medium passage sensor 11-4 detects a passage of a medium being conveyed (discharged) from the conveyance belts 13-5 and 13-6.

Each of the medium passage sensors 11-*n* (where n is 1, 2, 3, or 4) is implemented as a photointerrupter including a light emitter 11-*na* and a light receiver 11-*nb*, for example. The medium passage sensor 11-*n* detects a passage of a medium when the light emitted from the light emitter 11-*na* is not received by the light receiver 11-*nb*, for example.

The medium passage sensor 11-*n* stores therein information indicating whether media are passing at specific time intervals (e.g., at intervals of one second) as a log (operation log). The operation log corresponds to log information (first log information) indicating states of the monitoring target.

The conveyor apparatus 10 may also have a function for separating media that are fed in a manner stacking each other, and conveying the media. In such a case, the conveyor apparatus 10 may also include another sensor for detecting overlapping media. With such a sensor, when two media are detected to be fed in a manner overlapping on top of each other (the media 21-1 and 21-2 in FIG. 1), the conveyor apparatus 10 separates the top medium 21-1 and the bottom medium 21-2 by causing the conveyance belt 13-3 to rotate reversely at the timing at which the media 21-1 and 21-2 arrive at the medium passage sensor 11-2, and discharges the two media separately one after another, using the conveyance belts 13-5 and 13-6.

Note that the configuration of the conveyor apparatus 10 illustrated in FIG. 1 is one example. As long as the conveyor apparatus is at least capable of acquiring a path representing a transition of positions through which a medium passes (one example of the state of the conveyor apparatus) from a log or the like, any conveyor apparatus having any configuration may be used. Furthermore, the states of the conveyor apparatus are not limited to a position through which the medium passes. A transition path is information representing the transition of a state of the monitoring target.

An information processing system according to each embodiment will be explained below. Such an information processing system may be installed at the same location (e.g., site, office, or building) as the conveyor apparatus 10 that is the monitoring target, or installed at a location different from where the conveyor apparatus 10 is located and monitor the conveyor apparatus 10 remotely over a network (such as the Internet).

First Embodiment

FIG. 2 is a block diagram illustrating one example of a configuration of an information processing system 100 according to the first embodiment. As illustrated in FIG. 2, the information processing system 100 includes a plurality of storage units (a normal log storage unit 121, a candidate storage unit 122, an exception path storage unit 123, a path storage unit 124, an operation log storage unit 141, a deviating path storage unit 142, and a score storage unit 143), a leaner unit 110, a predicting unit 130, and a display 151.

The display 151 is a display device for displaying various types of information used in the information processing system 100. The display 151 is implemented as a liquid crystal display or a touch panel, for example.

Each of the storage units may be implemented as any storage medium generally used, such as a flash memory, a memory card, a random access memory (RAM), a hard disk drive (HDD), and an optical disc.

The storage units may be provided as physically separate storage media, or implemented as separate storage areas of the physically same storage medium. Furthermore, the storage units may also be implemented as a physically separate plurality of respective storage media.

The normal log storage unit 121 stores therein a normal log. The normal log is an operation log acquired in a specified time period (e.g., one month) in which it is presumed that the conveyor apparatus 10 has been operating normally, the operation log being a part of an operation log acquired in the past for the conveyor apparatus 10. The normal log may be generated by an apparatus external of the information processing system 100, or by the information processing system 100 (e.g., the leaner unit 110).

FIG. 3 is a schematic illustrating one example of a data structure of the operation log (normal log). As illustrated in FIG. 3, the operation log includes time, event, and media count. The event specifies a position through which the medium has passed, for example. In the explanation below, the position at which the passage of a medium is detected by the medium passage sensors 11-1 to 11-4 are denoted as P1, P2, P3, and P4, respectively. The media count represents the number of medium having passed the corresponding position.

Referring back to FIG. 2, the candidate storage unit 122 stores therein a normal path candidate generated by the leaner unit 110 (a candidate generating unit 111, which will be described later). A normal path is a transition path (first path) presumed to represent a first specific condition. The first specific condition is a normal condition, for example. The normal path includes a path that appears frequently in the transition path, or a path not appearing frequently but having been specified as normal in advance. A candidate generating process performed by the candidate generating unit 111 will be described later in detail.

The exception path storage unit 123 stores therein a predetermined reference path. A reference path is a path that is referred to by a correcting unit 112 during a process of correcting the normal path candidate. The reference path specifies a path to be added to or excluded as an exception (hereinafter, exception path), from the normal path candidate, for example.

The path storage unit 124 stores therein the normal path obtained by the correcting unit 112, as a result of correcting the normal path candidate using the exception path. The normal path corresponds to an abnormal sign detection model for detecting an abnormal sign.

The operation log storage unit 141 stores therein an operation log. The operation log stored in the operation log storage unit 141 is used as input data to the abnormal sign detection performed by the predicting unit 130. The operation log stored in the operation log storage unit 141 may be a log that is separate from the operation log from which the normal log is derived, or may include the same log. The normal log herein is a log having been used in the learning process of the leaner unit 110.

The deviating path storage unit 142 stores therein a deviating path. The deviating path represents a path extracted from the operation log by the predicting unit 130 (an extracting unit 131, to be described later), as a path deviating from the normal path.

The score storage unit 143 stores therein a sign score representing the severity of an abnormal sign calculated using a deviating path, by the predicting unit 130 (a score calculating unit 132, to be described later).

The leaner unit 110 executes a learning process for obtaining a normal path, by generating and correcting a normal path candidate, mainly using the normal log storage unit 121, the candidate storage unit 122, the exception path storage unit 123, and the path storage unit 124. The leaner unit 110 includes a candidate generating unit 111 and a correcting unit 112.

The candidate generating unit 111 generates a normal path candidate. Using a normal log, for example, the candidate generating unit 111 generates a transition path appearing frequently as a normal path candidate, among those extracted from the normal log. For example, the candidate generating unit 111 extracts a transition path representing a transition of positions through which the medium passes from the normal log, using sequential pattern extraction and generates, among those extracted, a transition path appearing at a frequency equal to or higher than a lower bound frequency, as a normal path candidate. The candidate generating unit 111 then stores the generated normal path candidate in the candidate storage unit 122.

In the exemplary conveyor apparatus 10 illustrated in FIG. 1, a frequently appearing transition path with only one medium will be "P1→P2→P3→P4". When two media are fed in a manner overlapping with each other, the two media are separated by a conveyance represented as "P2→P3→P2→P3". Therefore, the frequently appearing transition path will be "P1→P2→P3→P2→P3→P4".

The correcting unit 112 obtains a normal path by correcting the normal path candidate using the exception path. The exception path includes an exclusion path and an addition path. The exclusion path is a path specified in advance to be excluded from the normal path candidate. The addition path is a path specified in advance to be added to the normal path candidate. The correcting unit 112 corrects the normal path candidate by excluding the exclusion path from the candidate, for example. The correcting unit 112 also corrects the normal path candidate by adding the addition path to the candidate.

The correcting unit 112 stores the corrected normal path in the path storage unit 124. When there is no exclusion path in the normal path candidate, and no addition path is stored in the exception path storage unit 123, the correcting unit 112 stores therein the normal path candidate as it is, as a normal path in the path storage unit 124.

The exclusion path and the addition path are obtained in advance, based on acceleration tests (duration tests, reliability tests), design know-bows, mechanical characteristics, or from the viewpoint of maintenance of the conveyor apparatus 10, in a manner unrelated to the frequency of appearance, for example.

For example, a transition path "P1→P2→P1→P2→P3→P4" indicates that a process in which a medium has once advanced to P2, and then the medium has been moved back to P1 has taken place. This process corresponds to a situation in which the conveyance rollers 12-5 to 12-8 have attempted carry the medium but the conveyance has been interrupted because the frictional force against the medium surface is small, moved the medium back to the position P1, and carried the medium again to P2, for example. Such a transition path is not necessarily representing an abnormal sign, but can be interpreted as a normal path that is known to occur due to mechanical characteristics in advance. Such a path is stored as an addition path in the exception path storage unit 123.

By contrast, a situation in which a medium remains at the position P2 that is a conveying position for a while, e.g., "P1→P2→P2→P3→P4", can be interpreted as an abnormal sign, for example, in which worn rollers fail to convey the medium appropriately. When such a transition path appears frequently, the path may be stored in the candidate storage unit 122 as a frequent path candidate, but because this path is an abnormal sign, it is necessary to exclude this path from the candidate. Therefore, in the embodiment, such a transition path representing an abnormal sign is stored in the exception path storage unit 123 in advance, as an exclusion path.

The predicting unit 130 performs the abnormal sign detection mainly using the operation log storage unit 141, the deviating path storage unit 142, and the score storage unit 143. The abnormal sign detection is a process for detecting an abnormal sign by extracting a deviating path not conforming to a normal path (a path deviating from the normal path), and calculating a sign score based on the deviating path. The predicting unit 130 includes an extracting unit 131, a score calculating unit 132, a judgement unit 133, and an output control unit 134.

The extracting unit 131 extracts a deviating path not conforming to the normal path, from the operation log (second log information) collected during a determination time period in which it is determined whether the conveyor apparatus 10 that is the monitoring target has fell into a specific condition (e.g., an abnormality). For example, the extracting unit 131 extracts a normal path included in the path storage unit 124 from the operation log stored in the operation log storage unit 141, and stores the remaining transition path, remaining as a transition path other than the extracted normal path, in the deviating path storage unit 142, once in every certain time period (e.g., one day), as a deviating path.

For example, a transition path "P1→P2→P1→P2→P1→P2→P3→P4" indicates that the medium has frequently and repeatedly stopped at P2, and is not stored as a normal path in the path storage unit 124. Therefore, the extracting unit 131 extracts this transition path as a deviating path, and stores the transition path in the deviating path storage unit 142.

The score calculating unit 132 calculates a sign score using the extracted deviating path. For example, the score calculating unit 132 calculates a sign score once in every certain time period (e.g., one day), by setting a feed count in the certain time period as a denominator of a fraction, and setting the frequency at which a sequential path stored in the deviating path storage unit 142 has appeared in the certain time period as a numerator, and stores the sign score in the score storage unit 143. The feed count herein is the number of times a medium is fed into the conveyor apparatus 10.

The judgement unit 133 determines an abnormal sign using the calculated sign score. For example, the judgement unit 133 determines whether the sign score exceeds a predetermined warning threshold, once in every certain time period, and passes the determination result corresponding to the certain time period to the output control unit 134.

The sign determination method is not limited to the example described above. For example, the judgement unit 133 may also determine an abnormal sign by using a change in the calculated sign score (e.g., a gradient) over a plurality of target time periods. Examples of the target time periods include a time period within a present determination time period, and a time period within a past determination time period (e.g., one month ago). For example, the judgement unit 133 may obtain the amount by which a current sign score has changed from the past sign score (e.g., gradient), and determines that there is an abnormal sign when the amount of change exceeds a threshold. In situations in which false determinations occur because of a difference between the past time and the present time being too short, the past determination time period may be set so as to extend the difference.

The output control unit 134 controls outputs of various types of information that is used in the information processing system 100. For example, the output control unit 134 outputs information for visualizing all or some of the sign scores corresponding to respective certain time periods, the determination results made by the judgement unit 133, and the deviating paths, to the display 151.

The units described above (the leaner unit 110, the predicting unit 130) are implemented by one or more hardware processors, for example. These units may be implemented by causing a processor such as a central processing unit (CPU) to execute a computer program, i.e., as a piece of software, for example. The units described above may also be implemented by a processor such as a dedicated integrated circuit (IC), in other words, hardware. The units described above may also be implemented using software and hardware. When the processor is used in plurality, each of the processors may implement corresponding one, or two or more of the units described above.

Figure 4:
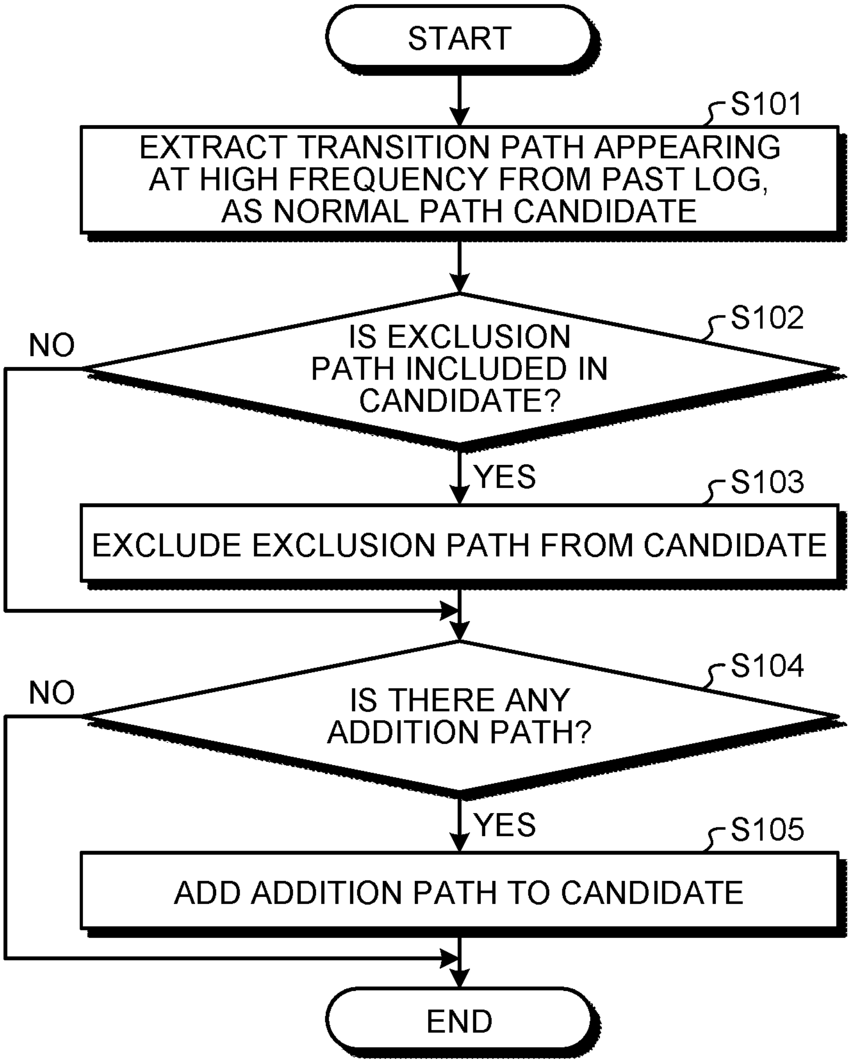
FIG. 4 is a flowchart of a learning process in the embodiment.

A learning process executed by the leaner unit 110 will now be explained. FIG. 4 is a flowchart illustrating one example of the learning process according to the first embodiment.

The candidate generating unit 111 extracts a transition path appearing at a high frequency from the past log stored in the normal log storage unit 121, as a normal path candidate, and stores the path in the candidate storage unit 122 (Step S101).

The correcting unit 112 determines whether the normal path candidate includes the exclusion path stored in the exception path storage unit 123 (Step S102). If the normal path candidate includes the exclusion path (Yes at Step S102), the correcting unit 112 excludes the exclusion path from the normal path candidate (Step S103).

If the normal path candidate does not include any exclusion path (No at Step S102), by proceeding to the completion of Step S103, the correcting unit 112 determines whether any addition path is stored in the exception path storage unit 123 (Step S104). If an addition path is stored (Yes at Step S104), the correcting unit 112 adds the addition path to the normal path candidate (Step S105).

If no addition path is stored (No at Step S104), and subsequently to the completion of Step S105, the leaner unit 110 ends the learning process.

Figure 5:
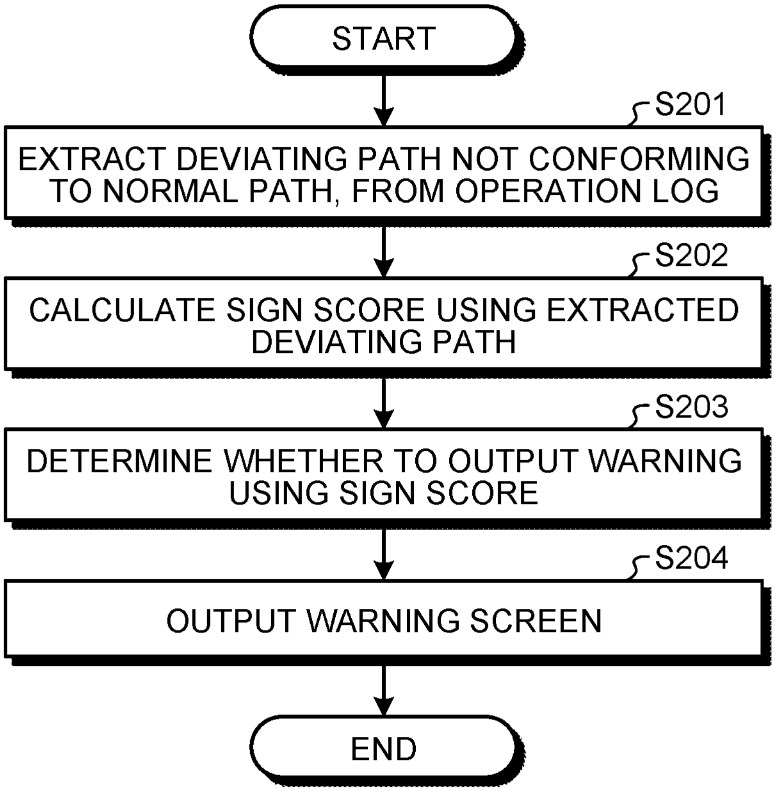
FIG. 5 is a flowchart of abnormal sign detection in the embodiment.

The abnormal sign detection performed by the predicting unit 130 will now be explained. FIG. 5 is a flowchart illustrating one example of the abnormal sign detection in the first embodiment.

The extracting unit 131 extracts a deviating path not conforming to the normal path, from the operation log stored in the operation log storage unit 141, and stores the deviating path in the deviating path storage unit 142 (Step S201). The score calculating unit 132 then calculates a sign score using the extracted deviating path (Step S202). The judgement unit 133 determines an abnormal sign using the calculated sign score (Step S203). The output control unit 134 outputs a warning screen for visualizing the sign score, the determination result made by the judgement unit 133, and the deviating path, for example, to the display 151 (Step S204).

Figure 6:
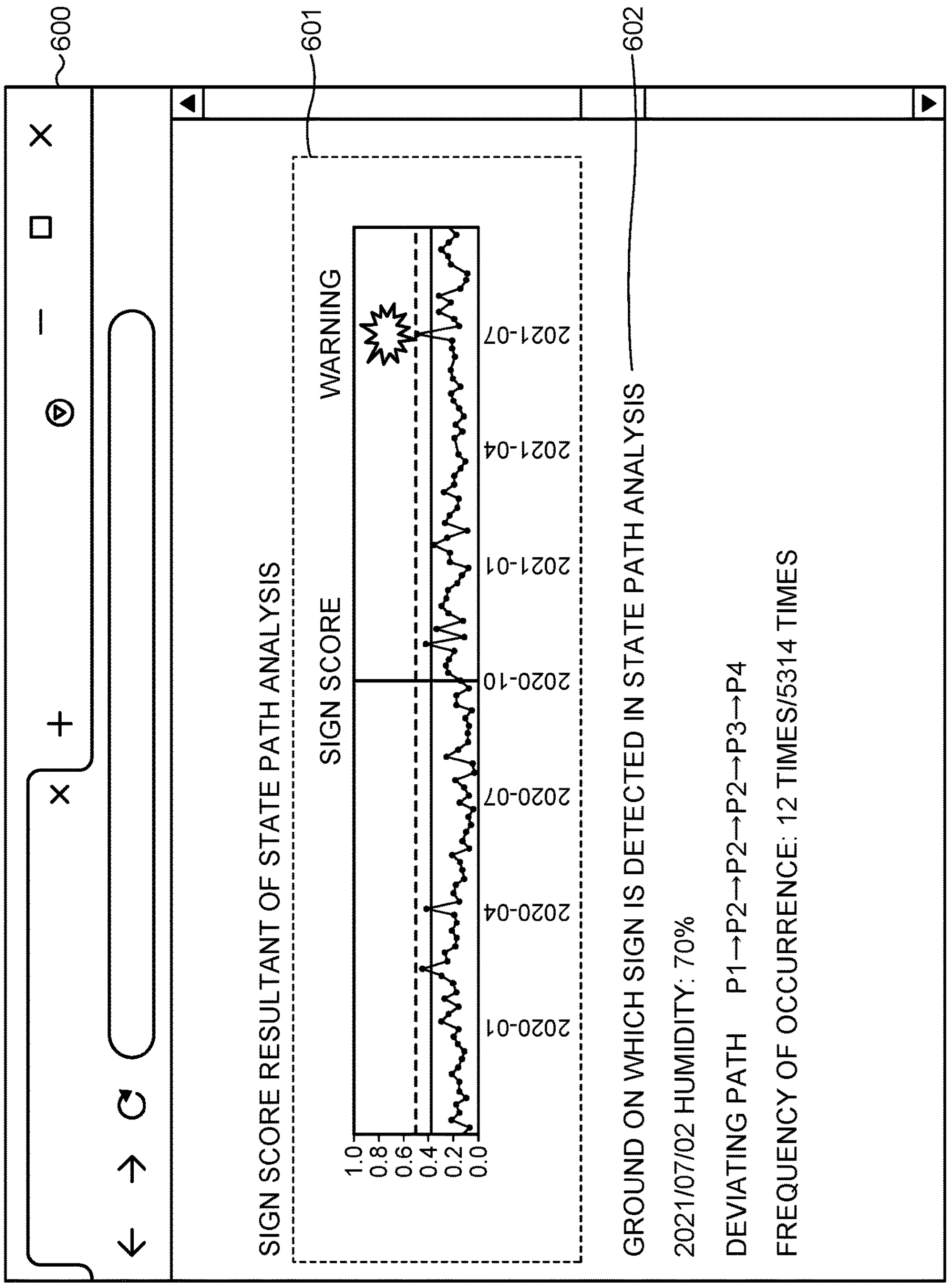
FIG. 6 is a schematic illustrating one example of a warning screen.

FIG. 6 is a schematic illustrating one example of the warning screen. As illustrated in FIG. 6, this warning screen 600 includes a graph 601 indicating a change in the sign score, and information 602 indicating the ground of a sign. The information 602 indicating the ground of a sign include information indicating the extracted deviating path and information indicating the frequency by which the deviating path has appeared, for example. With such a warning screen, it is possible to present the ground of the detection result, while detecting abnormal behaviors in the entire system.

In the manner described above, the information processing system according to the first embodiment extracts a normal path from an operation log corresponding to a time period of operating normally, and stores the normal path as an abnormal sign detecting model. The information processing system then detects an abnormal sign by obtaining a deviating path deviating from the normal path, from the operation log corresponding to the time period to be monitored. In this manner, the abnormal sign detection can be performed more appropriately.

According to this embodiment, it is possible to capture a condition deviating from various normal operating conditions as an abnormal sign, and to quantify how severe the abnormal sign is. In other words, normal paths representing normal operating conditions are extracted thoroughly from an operation log of the past, and calculates a sign score indicating how much a state sequence in a new operation log being monitored deviates from the normal paths. In this manner, unlike the method based on a state transition diagram for detecting limited causes of an abnormality, for example, a sign score can be calculated even for unknown abnormal signs. Furthermore, by outputting a deviating path, it becomes possible to clearly indicate what kind of system behavior is causing an abnormality in which part.

For example, because the sign score and the ground of sign detection (e.g., an abnormal point) can be detected at the same time, decision making related to maintenance inspections and part replacements are made easier. As a result, it becomes possible to improve the availability factor of the facility, and to improve the efficiency of the maintenance.

Furthermore, normal paths are extracted from an operation log of the past. As such, for example, even when there are individual differences in the operation of the conveyor apparatus 10, a normal path can be extracted in accordance with the operation of each conveyor apparatus 10. In this manner, by using the extracted normal path, abnormal signs can be detected more accurately.

Second Embodiment

An information processing system according to a second embodiment calculates a sign score using not only the deviating path but also additional information. An example of the additional information is weather information, but may be any other information related to abnormal signs.

Figure 7:
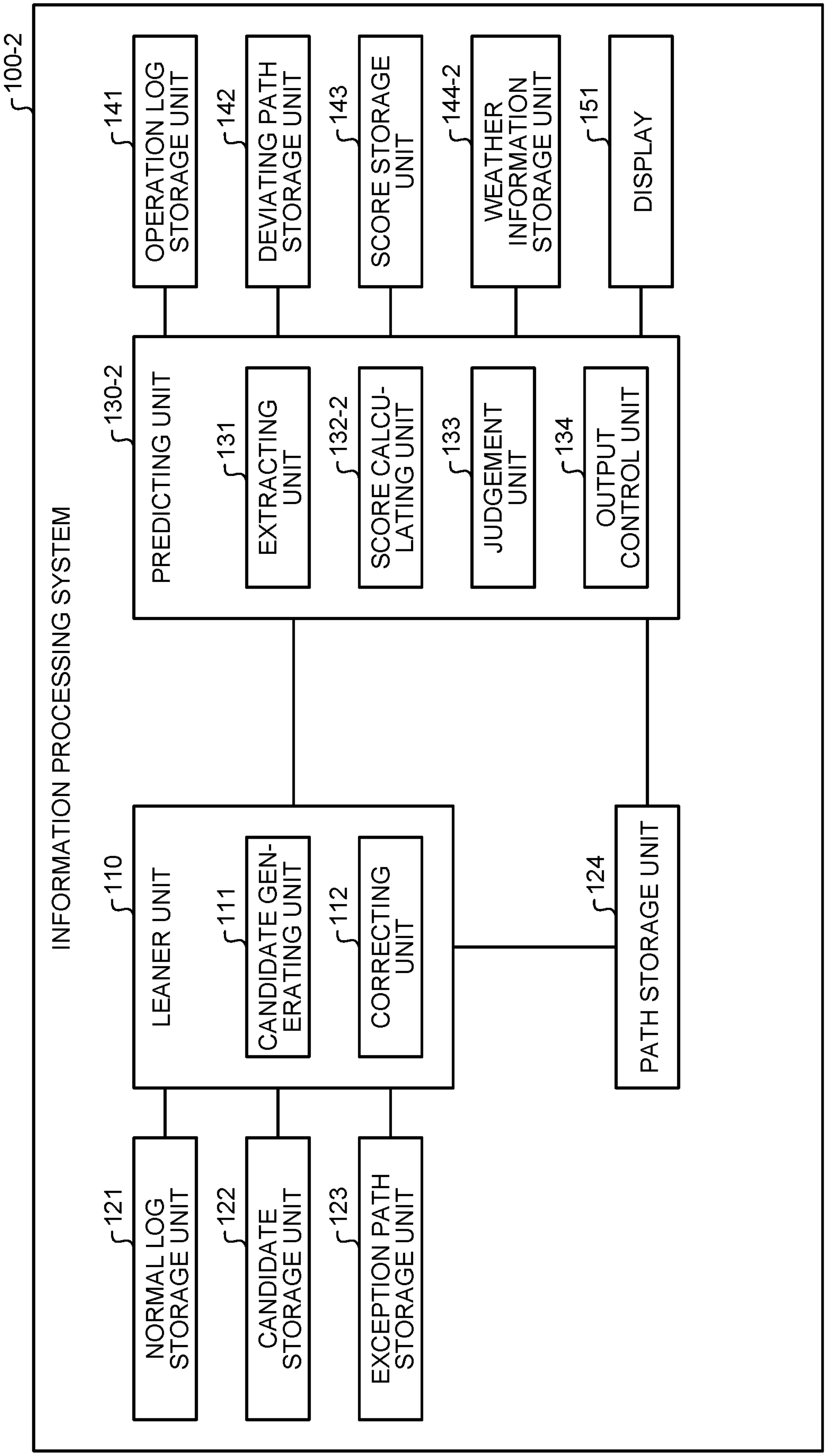
FIG. 7 is a block diagram of an information processing system according to a second embodiment.

FIG. 7 is a block diagram illustrating one example of a configuration of the information processing system 100-2 according to the second embodiment. As illustrated in FIG. 7, the information processing system 100-2 includes a plurality of storage units (the normal log storage unit 121, the candidate storage unit 122, the exception path storage unit 123, the path storage unit 124, the operation log storage unit 141, the deviating path storage unit 142, the score storage unit 143, and a weather information storage unit 144-2), the leaner unit 110, a predicting unit 130-2, and the display 151.

The second embodiment is different from the first embodiment in that the weather information storage unit 144-2 is added, and the score calculating unit 132-2 in the predicting unit 130-2 has a different function. Because the other configurations and functions are the same as those illustrated in FIG. 2, which is a block diagram of the information processing system 100 according to the first embodiment, the same reference numerals are assigned thereto, and explanations thereof hereunder will be omitted.

The weather information storage unit 144-2 stores therein the weather information of the location where the conveyor apparatus 10 that is the monitoring target is installed, at least during the determination time period for which abnormalities are to be determined. Examples of the weather information include temperature, humidity, barometric pressure, and precipitations, but may include any other weather-related information.

The score calculating unit 132-2 calculates a sign score using a deviating path and weather information. For example, the score calculating unit 132-2 calculates a sign score by dividing the value obtained from the frequency of occurrence/feed count, in the same manner as in the first embodiment, by a highest humidity, in the corresponding certain time period, observed in a meteorological observatory nearby the installation location of the conveyor apparatus 10.

For example, an abnormal sign temporarily becomes more likely to appear when the humidity is high, but there are also cases in which the humidity does not affect the degree by which a degradation of the conveyor apparatus 10 takes place. According to this embodiment, by using a sign score corrected with humidity, the abnormal sign detection considering such conditions can be achieved.

Because the sequence of the learning process and the sequence of the abnormal sign detection are the same as those according to the embodiment described above (FIGS. 4 and 5), except that the calculation of the sign score is different, explanations thereof will be omitted.

Third Embodiment

Explained in a third embodiment is an exemplary configuration in which the monitoring target is remotely monitored. FIG. 8 is a block diagram illustrating one example of a configuration of an information processing system 100-3 according to the third embodiment. As illustrated in FIG. 8, the information processing system 100-3 has a configuration in which a learner apparatus 200-3 and a predicting apparatus 300-3 are connected over a network 400-3

An example of the network 400-3 is the Internet, but may be any other types of network. The network 400-3 may be a wireless network, a wired network, or a hybrid network including a wireless network and a wired network.

The learner apparatus 200-3 is an apparatus mainly provided with the function related to the learning process. The learner apparatus 200-3 may be provided as a server on a cloud environment, for example.

The learner apparatus 200-3 includes the normal log storage unit 121, the candidate storage unit 122, the exception path storage unit 123, the path storage unit 124, the leaner unit 110, and a communication control unit 201-3. Because the units other than the communication control unit 201-3 have the same functions as those in the embodiments described above, the same reference numerals are assigned thereto, and explanations thereof will be omitted.

The communication control unit 201-3 controls communications with external apparatus such as the predicting apparatus 300-3. For example, the communication control unit 201-3 transmits the normal paths obtained as a result of the learning process to the predicting apparatus 300-3 over the network 400-3.

The predicting apparatus 300-3 is an apparatus mainly provided with the function related to the abnormal sign detection. The predicting apparatus 300-3 may be provided as a server installed in the same location as the conveyor apparatus 10, for example. The predicting apparatus 300-3 may be also provided as a server in a cloud environment, for example.

The predicting apparatus 300-3 includes the predicting unit 130, the operation log storage unit 141, the deviating path storage unit 142, the score storage unit 143, a path storage unit 145-3, the display 151, and a communication control unit 301-3. Because the units other than the path storage unit 145-3 and the communication control unit 301-3 have the same functions as those in the embodiments described above, the same reference numerals are assigned thereto, and explanations thereof will be omitted.

The path storage unit 145-3 stores therein normal paths received from the learner apparatus 200-3. It is also possible for the path storage unit 145-3 not to be included in the predicting apparatus 300-3, and the predicting unit 130 (the extracting unit 131) may be configured to extract a deviating path by referring to the path storage unit 124 in the learner apparatus 200-3.

The communication control unit 301-3 controls communications with external apparatus such as the learner apparatus 200-3. For example, the communication control unit 301-3 receives the normal path obtained as a result of the learning process from the learner apparatus 200-3 over the network 400-3.

Because the sequence of the learning process and the sequence of the abnormal sign detection are the same as those according to the embodiment described above (FIGS. 4 and 5), explanations thereof will be omitted.

In the manner described above, the information processing system according to the third embodiment can achieve a configuration in which the functions are distributed across a plurality of apparatuses.

In the manner explained above, according to the first to the third embodiments, it is possible to perform the abnormal sign detection more appropriately.

Figure 9:
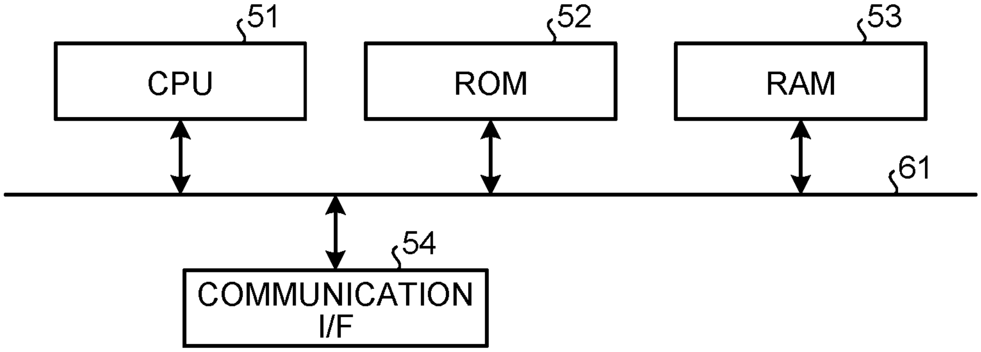
FIG. 9 is a schematic of hardware of the information processing system according to the embodiments.

A hardware configuration of the information processing systems according to the first to the third embodiments will now be explained with reference to FIG. 9. FIG. 9 is a schematic for explaining an exemplary hardware configuration of the information processing systems according to the first to the third embodiments.

The information processing systems according to the first to the third embodiments include a controller such as a central processing unit (CPU) 51, a storage device such as a read-only memory (ROM) 52 and a random access memory (RAM) 53, a communication interface (I/F) 54 connecting and communicating with a network, and a bus 61 connecting these units.

A computer program executed on the information processing systems according to the first to the third embodiments is provided in a manner incorporated in the ROM 52 or the like in advance.

The computer program executed by the information processing systems according to the first to the third embodiments may be provided as a computer program product, in a manner recorded in a computer-readable medium, such as compact disc read-only memory (CD-ROM), a flexible disk (FD), compact disc recordable (CD-R), or a digital versatile disc (DVD), as a file in an installable or executable format.

Furthermore, the computer program executed by the information processing systems according to the first to the third embodiments may be stored in a computer connected to a network such as the Internet, and made available for download over the network. Furthermore, the computer program executed by the information processing systems according to the first to the third embodiments may be provided or distributed over a network such as the Internet.

The computer program executed by the information processing systems according to the first to the third embodiments may cause a computer to function as the units included in the information processing system described above. This computer can cause the CPU 51 to read the computer program from a computer-readable storage medium onto a main memory, and to execute the computer program.

The configuration examples of the embodiment will be described below.

Configuration Example 1

An information processing apparatus includes one or more hardware processors configured to function as a candidate generating unit that generates, using first log information indicating states of a monitoring target and acquired in a certain time period, a frequently appearing transition path of states of the monitoring target, as a candidate of a first path that is a transition path presumed to represent a first specific condition; and a correcting unit that obtains the first path by correcting the candidate using a predetermined reference path.

Configuration Example 2

The information processing apparatus according to the Configuration Example 1, wherein the one or more hardware processors are configured to further function as an extracting unit that extracts a deviating path not conforming to the first path, from second log information indicating states of the monitoring target, the second log information being obtained in a determination time period for which a determination is made as to whether the monitoring target is in a second specific condition; a score calculating unit that calculates a score indicating a severity of a sign of the second specific condition using the deviating path; a judgement unit that determines a sign of the second specific condition using the score; and an output control unit that outputs information for visualizing all or some of the score, a determination result made by the judgement unit, and the deviating path.

Configuration Example 3

The information processing apparatus according to the Configuration Example 2, wherein the score calculating unit calculates the score using the deviating path and weather information in the determination time period.

Configuration Example 4

The information processing apparatus according to the Configuration Examples 2 or 3, wherein the score calculating unit calculates the score for each of a plurality of target time periods, and the judgement unit determines a sign of the second specific condition using a change in a plurality of scores calculated for the plurality of target time periods.

Configuration Example 5

The information processing apparatus according to any one of the Configuration Examples 2 to 4, wherein the one or more hardware processors are configured to further function as a learner unit including the candidate generating unit and the correcting unit; and a predicting unit including the extracting unit, the score calculating unit, the judgement unit, and the output control unit.

Configuration Example 6

The information processing apparatus according to any one of the Configuration Examples 2 to 5, wherein the reference path includes a predetermined exclusion path as a path to be excluded from the candidate, and the correcting unit obtains the first path by excluding the exclusion path from the candidate.

Configuration Example 7

The information processing apparatus according to any one of the Configuration Examples 2 to 6, wherein the reference path includes a predetermined addition path as a path to be added to the candidate, and the correcting unit obtains the first path by adding the addition path to the candidate.

Configuration Example 8

8. The information processing apparatus according to any one of the Configuration Examples 1 to 7, wherein the monitoring target is a conveyor apparatus that conveys a medium, the states each indicate a position through which the medium passes, and the transition path indicates a transition of positions through which the medium passes.

Configuration Example 9

The information processing apparatus according to any one of the Configuration Examples 1 to 8, wherein the first specific condition is a normal condition.

Configuration Example 10

The information processing apparatus according to any one of the Configuration Examples 2 to 4, wherein the second specific condition is an abnormal condition.

Configuration Example 11

An information processing method executed by an information processing apparatus, the method includes generating, using first log information indicating states of a monitoring target and acquired in a certain time period, a frequently appearing transition path of states of the monitoring target, as a candidate of a first path that is a transition path presumed to represent a first specific condition; and obtaining the first path by correcting the candidate using a predetermined reference path.

Configuration Example 12

A computer program product having a non-transitory computer readable medium including programmed instructions stored thereon, wherein the instructions, when executed by a computer, cause the computer to perform generating, using first log information indicating states of a monitoring target and acquired in a certain time period, a frequently appearing transition path of states of the monitoring target, as a candidate of a first path that is a transition path presumed to represent a first specific condition; and obtaining the first path by correcting the candidate using a predetermined reference path.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising: one or more hardware processors configured to function as:

a candidate generating unit that generates, using first log information indicating states of a monitoring target and acquired in a certain time period, a frequently appearing transition path of states of the monitoring target, as a candidate of a first path that is a transition path presumed to represent a first specific condition;

a correcting unit that obtains the first path by correcting the candidate using a predetermined reference path; and an extracting unit that extracts a deviating path not conforming to the first path, from second log information indicating states of the monitoring target, the second log information being obtained in a determination time period for which a determination is made as to whether the monitoring target is in a second specific condition, the determination time period being a period for which an abnormal sign detection is performed, the abnormal sign detection detecting an abnormal sign from the second log information using the first path.

2. The information processing apparatus according to claim 1, wherein the one or more hardware processors are configured to further function as:

a score calculating unit that calculates a score indicating a severity of a sign of the second specific condition using the deviating path;

a judgement unit that determines a sign of the second specific condition using the score; and an output control unit that outputs information for visualizing all or some of the score, a determination result made by the judgement unit, and the deviating path.

3. The information processing apparatus according to claim 2, wherein the score calculating unit calculates the score using the deviating path and weather information in the determination time period.

4. The information processing apparatus according to claim 2, wherein the score calculating unit calculates the score for each of a plurality of target time periods, and the judgement unit determines a sign of the second specific condition using a change in a plurality of scores calculated for the plurality of target time periods.

5. The information processing apparatus according to claim 2, wherein the one or more hardware processors are configured to further function as:

a learner unit including the candidate generating unit and the correcting unit; and a predicting unit including the extracting unit, the score calculating unit, the judgement unit, and the output control unit.

6. The information processing apparatus according to claim 2, wherein the reference path includes a predetermined exclusion path as a path to be excluded from the candidate, and the correcting unit obtains the first path by excluding the exclusion path from the candidate.

7. The information processing apparatus according to claim 2, wherein the reference path includes a predetermined addition path as a path to be added to the candidate, and the correcting unit obtains the first path by adding the addition path to the candidate.

8. The information processing apparatus according to claim 1, wherein the monitoring target is a conveyor apparatus that conveys a medium, the states each indicate a position through which the medium passes, and the transition path indicates a transition of positions through which the medium passes.

9. The information processing apparatus according to claim 1, wherein the first specific condition is a normal condition.

10. The information processing apparatus according to claim 2, wherein the second specific condition is an abnormal condition.

11. An information processing method executed by an information processing apparatus, the method comprising:

generating, using first log information indicating states of a monitoring target and acquired in a certain time period, a frequently appearing transition path of states of the monitoring target, as a candidate of a first path that is a transition path presumed to represent a first specific condition;

obtaining the first path by correcting the candidate using a predetermined reference path; and extracting a deviating path not conforming to the first path, from second log information indicating states of the monitoring target, the second log information being obtained in a determination time period for which a determination is made as to whether the monitoring target is in a second specific condition, the determination time period being a period for which an abnormal sign detection is performed, the abnormal sign detection detecting an abnormal sign from the second log information using the first path.

12. A computer program product having a non-transitory computer readable medium including programmed instructions stored thereon, wherein the instructions, when executed by a computer, cause the computer to perform:

generating, using first log information indicating states of a monitoring target and acquired in a certain time period, a frequently appearing transition path of states of the monitoring target, as a candidate of a first path that is a transition path presumed to represent a first specific condition;

obtaining the first path by correcting the candidate using a predetermined reference path; and extracting a deviating path not conforming to the first path, from second log information indicating states of the monitoring target, the second log information being obtained in a determination time period for which a determination is made as to whether the monitoring target is in a second specific condition, the determination time period being a period for which an abnormal sign detection is performed, the abnormal sign detection detecting an abnormal sign from the second log information using the first path.

13. An information processing apparatus comprising:

one or more hardware processors configured to function as:

a candidate generating unit that generates, using first log information indicating states of a monitoring target and acquired in a certain time period, a frequently appearing transition path of states of the monitoring target, as a candidate of a first path that is a transition path presumed to represent a first specific condition; and a correcting unit that obtains the first path by correcting the candidate using a predetermined reference path, wherein the reference path includes a predetermined addition path as a path to be added to the candidate, and the correcting unit obtains the first path by adding the addition path to the candidate.

14. The information processing apparatus according to claim 13, wherein the addition path is obtained in advance in a manner unrelated to a frequency of appearance.

* * * * *